Dec. 29, 1942. H. T. TUCKER 2,306,673
COMBINED SEAT BACK REST
Filed March 30, 1940
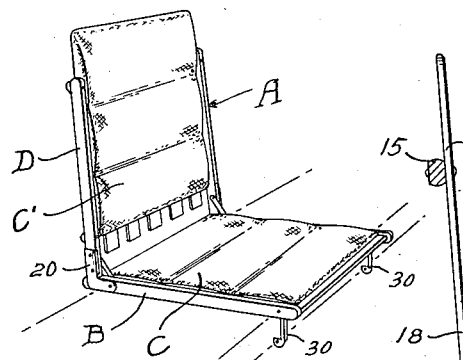
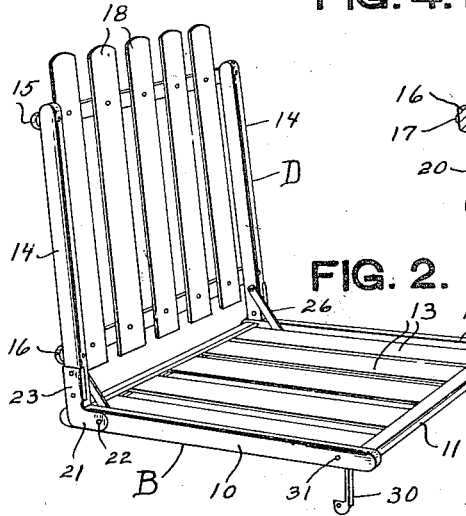
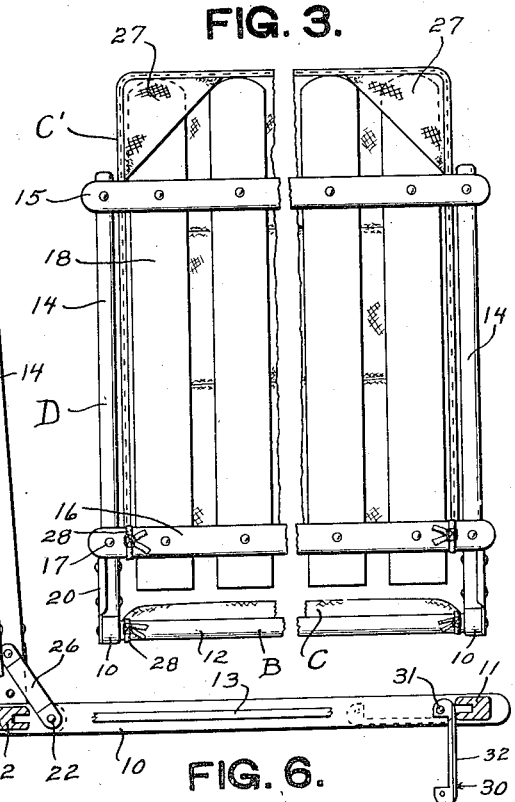
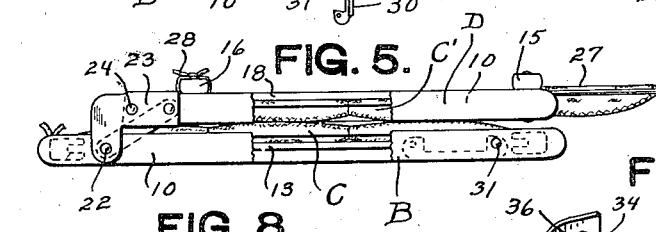
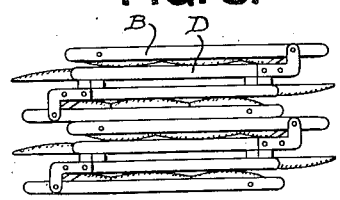
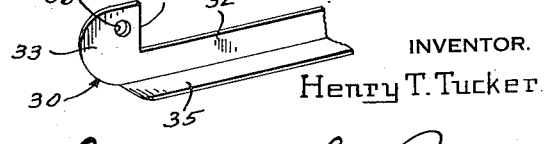
INVENTOR.
Henry T. Tucker
BY Lancaster, Allwine and Rommel
ATTORNEYS Patented Dec. 29, 1942

2,306,673

UNITED STATES PATENT OFFICE 2,306,673

COMBINED SEAT AND BACK REST

Henry Temple Tucker, Fort Smith, Ark., assignor to Tucker Duck & Rubber Co., Fort Smith, Ark., a corporation of Arkansas Application March 30, 1940, Serial No. 326,940

2 Claims. (Cl. 155—133)

The present invention relates to improvements in combined seat and back rests and more particularly to portable devices of this character adapted for use upon boat, bleacher and other seats so as to afford greater comfort to the user.

The primary object of the invention is to provide a combined seat and back rest which may be readily folded into flat compact form and easily carried from place to place, and which when applied to a seat board or the like, will afford great comfort to the user and permit the user to lean backward without danger of the seat tipping rearward.

A further object resides in the novel construction wherein the means for retaining the seat securely in place upon a seat board or the like, may be disposed out of the way, as when the seat is used on a smooth surface.

A further object resides in the interchangeability of parts whereby the cost of construction and time of assembling is greatly reduced, as well as permitting use of the cushions for other purposes when desired.

A further object is to provide a portable seat structure of this character which will fold flat for easy carrying and storing, and wherein a number of the seats may be compactly stacked one upon the other.

A still further object is to provide a device of this character which will be strong and durable in use, and wherein the swinging latch means for securing the device to a seat board have limited swinging movement beyond positions for proper engagement with an edge of the seat board.

A still further object resides in the novel hinge joint connection between the seat and back rest portions whereby a reinforced joint is provided when the device is opened for use, and the seat and back rest portions slightly spaced in parallel relation when folded to neatly accommodate and retain the cushions therebetween without any crowding of the cushions at the hinge connection.

Other objects and advantages of the invention will be apparent from the following detailed description taken in connection with the accompanying drawing forming a part of this specification and in which drawing—

Figure 1 is a perspective view of the seat in open position, as applied to a seat board.

Figure 2 is a perspective view with the cushions or pads removed.

Figure 3 is a rear view of the seat in open position and with the latch hooks swung out of the way as when the seat is used upon a smooth surface.

Figure 4 is a central vertical section without the cushions.

Figure 5 is a side edge view of the seat folded and showing portions of the side rails broken away.

Figure 6 is an enlarged perspective view of one of the hinge members.

Figure 7 is a fragmentary perspective view of one end portion of one of the latch hook members.

Figure 8 is a view showing the manner in which a number of the seat structures may be compactly stacked one upon the other.

Referring to the drawing in detail and wherein like reference characters designate corresponding parts thruout the several views, the letter A designates the combined seat and back rest as a whole, including a seat portion B provided with a cushion or pad C, and a back rest portion D provided with a cushion or pad C'.

The seat portion B comprises a flat wooden seat frame embodying side rails 10 connected adjacent their forward ends by a front cross rail 11 and adjacent their rear ends by a rear cross rail 12. These cross rails 11 and 12 have their ends abutting the inner surfaces of the side rails and are grooved at their inner edges to receive the ends of spaced apart seat slats 13 which extend parallel to the side rails 10 and are disposed midway between the upper and lower surfaces of the seat frame, as shown in Figure 4. With this arrangement, the seat slats will give or yield slightly with the body weight of a user.

The back rest portion D comprises a wooden rest frame having a width even to that of the seat frame, and embodies side rails 14 connected at their upper ends by an upper cross rail 15 and connected at a point spaced a short distance upward from their lower ends by a lower cross rail 16. These cross rails 15 and 16 are secured at their ends to the rear edges of the side rails 14 as by rivets or the like 17. Secured as by riveting or any other preferred manner, upon the front of the cross rails 15 and 16 are spaced apart slats 18 which have their upper ends rounded and extending above the upper ends of the side rails 14, and have their lower ends terminating above the lower ends of the side rails 14. By having the cross rails 15 and 16 secured to the rear of the side rails 14 one provides a recess at the front of the back rest portion for accommodating the cushion C', as shown in Figure 5.

The lower end of the rest frame of the back rest portion D is hingedly connected to the rear of the seat frame of the seat portion B by a pair of L-shaped hinge members 20 whereby when the rest portion is swung open, the lower ends of its side rails 14 abut upon the upper surfaces of the side rails 10 of the seat portion B for limiting rearward swinging of the rest portion, as in Figure 4, and when the rest portion is swung closed, the hinge members dispose the rest portion in slightly parallel spaced relation to the seat portion, as in Figure 5. These L-shaped hinge members 20 are formed with a flat hinge plate portion or arm 21 having a width slightly less than the width of the side rails 10. These plate-like arms 21 overlie the outer surfaces of the side rails 10 and are pivotally connected adjacent their free ends to the side rails 10 by pivot pins 22 which extend thru the side rails just forward of the rear cross rail 12. An attaching plate portion or arm 23 extends from one end of the arm 21 and is secured as by rivets or the like 24 over the outer surface of the lower ends of the side rails 14, whereby these side rails 14 swing in planes of their respective side rails 10. The arms 23 may have stiffening side flanges 25 which overlap the corner edges of the side rails 14. The upper ends of the arms 23 terminate just beneath the lower cross rail 16 of the rest portion.

Connected between each pivot pin 22 and the upper rivets 24, at the inside of the side rails, is a straight reinforcing and tensioning strap 26 which pivots on the pivot pin 22. These straps 26, aside from reinforcing the hinge members 20, also serve as tension members limiting rearward swinging of the back rest portion D. When the seat is open they also assist in holding the cushion or pad C centered on the seat as shown in Figure 1.

The cushions or pads C and C' are of like construction and readily detachable from their respective seat and back frames so as to be interchangeable one for the other. These cushions may be suitably padded and are provided at the corners on one end and at the rear side with triangular-shaped corner pieces forming triangular-shaped pockets 27. Secured to each of the corners at the opposite end of the cushion is a tie cord or tape 28.

The cushions are of a width about equal to the spacing between the side rails of the seat and rest portions and of a length substantially equal to the distance between the front and rear cross rails of the seat frame. The cushion C is secured to the seat frame B by tying the tapes 28 thereof about the rear cross rail 12 of the seat frame. The cushion C' is secured in place on the back rest portion D by first slipping the upper ends of the outermost slats 18 into the pockets 27 and then tying the tapes of the cushion C' about the lower cross rail 16. As will be seen, the pockets 27 are of a depth equal to the height of the slats 18 above the upper cross rail 15, whereby the lower ends of the pockets engage the rail 15 and relieve some of the strain on the upper ends of the pockets. By having the cushions separate, one allows for interchanging of the cushions and use may be made of them for other purposes, as well as use may be made of both cushions to sit on if desired. Owing to the construction of the rest portion D, providing a recess at the front of the rest portion, the cushions will be neatly confined between the seat and rest portions when in folded condition.

Referring now to the swinging or pivoted latch means for retaining the seat structure upon a seat board or the like, this means comprises two preferably metal latch hook members 30 which are pivoted upon the inside of and adjacent to the forward end portions of the side rails 10, just rearward of the front cross rail 11, as upon pivot pins 31. These latch hooks 30 are also interchangeable and are formed with a flat body portion 32 which is recessed along its rear edge forming a head 33 at each end of the body portion, provided with a shoulder 34. Provided along the front edge of the body portion 32 is a right angular flange 35 forming a stop flange extending substantially thruout the length of the latch member. These right angular stop flanges 35, when the latch members are swung down as in Figure 4, abut the inner edge of the front cross rail 11 and limit forward swinging movement of the latch members beyond a position substantially at a right angle to the plane of the seat portion B, whereby the shoulders 34 will properly engage beneath the front edge of a seat board and prevent rearward tipping of the seat structure. An opening 36 is provided in each head 33 of the latch members for receiving the pivot pin 31 in accordance with which of the side rails 10 the latch member is pivoted upon.

As shown by the dotted line showing in Figure 4, the latch members 30 have a width slightly less than the width of the side rails 10 whereby when the latch members are swung up, they will be disposed entirely between the upper and lower planes of the seat portion and permit the seat portion to be used upon a smooth surface without interference of the latch members.

As shown in Figure 8, the flat folding of the seat structure permits a number of the seats to be compactly stacked one upon the other for carrying or storing.

Changes in details may be made to the form of the invention herein shown and described, without departing from the spirit of the invention or the scope of the following claims.

I claim:

1. A combined seat and back rest comprising a seat portion and a rest portion each embodying side rails movable into abutting relation to limit rearward swinging of the rest portion, L-shaped hinge members connecting the seat and rest portions each having one arm thereof rigidly secured to the lower end of a side rail of the rest portion and the other arm thereof pivoted at its end to a side rail of the seat portion whereby the side rails of the rest portion swing in the planes of the side rails of the seat portion, and a straight tensioning strap member associated with each hinge member, said strap members being pivoted at one end on the pivotal axis of their hinge members and having their other ends fixed to said rest portion.

2. A combined seat and back rest comprising a seat portion having side rails and a front cross rail, a rest portion hingedly connected to the rear of the seat portion, and a latch hook pivoted on the inside of each side rail, said latch hooks each having a body portion which is recessed along one side providing a head at each end of the body portion having a pivot receiving opening, and a right angular stop flange along the other side of the body portion for abutting the rear side of the front cross rail when the latch members are swung open.

HENRY TEMPLE TUCKER.